(12) United States Patent
Kanodia

(10) Patent No.: US 10,108,477 B2
(45) Date of Patent: Oct. 23, 2018

(54) MOBILE DEVICE DIAGNOSTICS

(71) Applicant: Pervacio Inc., Kirkland, WA (US)

(72) Inventor: Sanjay Kanodia, Irving, TX (US)

(*) Notice: Subject to any disclaimer, the term of this patent is extended or adjusted under 35 U.S.C. 154(b) by 157 days.

(21) Appl. No.: 15/177,970

(22) Filed: Jun. 9, 2016

(65) Prior Publication Data

US 2017/0116062 A1 Apr. 27, 2017

Related U.S. Application Data

(60) Provisional application No. 62/245,872, filed on Oct. 23, 2015.

(51) Int. Cl.
| | |
|---|---|
| *G06F 11/00* | (2006.01) |
| *G06F 11/07* | (2006.01) |
| *G06F 8/61* | (2018.01) |
| *G06F 11/32* | (2006.01) |
| *H04L 12/24* | (2006.01) |
| *G06F 9/451* | (2018.01) |

(52) U.S. Cl.
CPC .......... *G06F 11/079* (2013.01); *G06F 8/61* (2013.01); *G06F 11/0742* (2013.01); *G06F 11/0748* (2013.01); *G06F 11/32* (2013.01); *G06F 11/321* (2013.01); *H04L 41/5074* (2013.01); *G06F 9/452* (2018.02)

(58) Field of Classification Search
CPC .......... G06F 11/079; G06F 11/0742; G06F 11/0748; G06F 11/32; G06F 11/321; G06F 9/4445; G06F 9/452; H04L 41/5074

See application file for complete search history.

(56) References Cited

U.S. PATENT DOCUMENTS

| | | | |
|---|---|---|---|
| 5,491,791 A * | 2/1996 | Glowny | G06F 11/0709 714/26 |
| 6,742,141 B1 | 5/2004 | Miller | |
| 6,988,055 B1 * | 1/2006 | Rhea | G06F 11/006 702/182 |
| 7,146,305 B2 | 12/2006 | van der Made | |
| 8,151,099 B2 | 4/2012 | Wagner et al. | |
| 8,219,720 B2 | 7/2012 | Saint-Hilaire et al. | |
| 8,352,802 B2 * | 1/2013 | Katz | G06F 11/2294 714/46 |
| 8,355,585 B2 | 1/2013 | Kamay et al. | |
| 8,474,009 B2 | 6/2013 | Burch et al. | |
| 8,573,474 B2 | 11/2013 | Vasquez et al. | |
| 8,621,362 B2 | 12/2013 | Castellani et al. | |
| 8,811,595 B2 | 8/2014 | Werth et al. | |
| 8,862,695 B2 | 10/2014 | Spracklen et al. | |

(Continued)

*Primary Examiner* — Philip Guyton
(74) *Attorney, Agent, or Firm* — MP Patents, LLC

(57) ABSTRACT

According to one method for mobile device service, with a user diagnostics application running on a user mobile device a user diagnostics screen is presented to a display of the user mobile device, diagnostics data is recorded from the user mobile device in response to input made at a customer care agent terminal, the user diagnostics screen of the diagnostics application is mirrored at the customer care agent terminal and the mirrored user diagnostics screen is populated with the diagnostics data. Mobile device graphics display data is excluded from transmission to the customer care agent terminal. A system for providing the mobile device service and an associated computer program product are also provided.

23 Claims, 15 Drawing Sheets

(56) References Cited

U.S. PATENT DOCUMENTS

| | | |
|---|---|---|
| 8,943,506 B2 | 1/2015 | Tang et al. |
| 9,003,327 B2 | 4/2015 | Moshrefi et al. |
| 9,009,219 B2 | 4/2015 | Chawla et al. |
| 9,015,234 B2 | 4/2015 | Park et al. |
| 9,055,080 B2 | 6/2015 | Sandhu et al. |
| 9,075,496 B1 | 7/2015 | Gailey |
| 9,110,581 B2 | 8/2015 | Momchilov |
| 9,813,555 B2* | 11/2017 | Perez .................. G06F 11/0748 |
| 2003/0040937 A1 | 2/2003 | Gregersen et al. |
| 2004/0153712 A1 | 8/2004 | Owhadi et al. |
| 2008/0209255 A1* | 8/2008 | Seguin ................. G06F 11/0748 714/2 |
| 2008/0267169 A1 | 10/2008 | Mundra et al. |
| 2009/0018890 A1 | 1/2009 | Werth et al. |
| 2009/0222739 A1* | 9/2009 | Schmieder ............ G06F 9/4443 715/740 |
| 2011/0087511 A1 | 4/2011 | Werth et al. |
| 2011/0252384 A1* | 10/2011 | Calman ................ G06F 9/4445 715/864 |
| 2012/0019770 A1 | 1/2012 | DiChiara |
| 2012/0079100 A1* | 3/2012 | McIntyre ............. G06F 11/0742 709/224 |
| 2012/0324118 A1 | 12/2012 | Pfleider et al. |
| 2013/0007224 A1 | 1/2013 | Yang |
| 2013/0047038 A1* | 2/2013 | Huang ................. G06F 11/0748 714/38.1 |
| 2013/0103973 A1 | 4/2013 | Werth et al. |
| 2014/0006634 A1 | 1/2014 | Eacott et al. |
| 2014/0129663 A1 | 5/2014 | Landers et al. |
| 2014/0149980 A1 | 5/2014 | Vittal et al. |
| 2014/0154648 A1* | 6/2014 | Gonsalves ............. G06Q 10/10 434/219 |
| 2014/0327599 A1 | 11/2014 | Awad |
| 2015/0095717 A1 | 4/2015 | Frenz et al. |
| 2015/0135082 A1* | 5/2015 | Slay, Jr. ................. H04L 67/20 715/736 |
| 2015/0186233 A1 | 7/2015 | Young et al. |
| 2015/0229699 A1 | 8/2015 | Liu |
| 2015/0319178 A1* | 11/2015 | Desai .................... G06F 9/4443 726/1 |

* cited by examiner

MOBILE DEVICE DIAGNOSTICS

CROSS-REFERENCE TO RELATED APPLICATIONS

This application claims priority to and incorporates by reference in its entirety U.S. Provisional Application No. 62245872 filed Oct. 23, 2015 and entitled 'CARE AGENT DIAGNOSTICS'.

BRIEF DESCRIPTION OF THE FIGURES

The following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the present disclosure and manners by which they can be implemented. Although the best mode of carrying out the present service has been disclosed, those skilled in the art would recognize that other embodiments for carrying out or practicing the present disclosure are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the present disclosure provide a method for diagnosis and service of mobile devices which may also be considered as a mobile device service. With a mirrored solution between a mobile device user and a customer care agent and using, in an embodiment, a website and a mobile device application controlled by the customer care agent, remote service for the purpose of device diagnostics and resolution and/or repair is enabled.

Embodiments of the present disclosure substantially eliminate, or at least partially address, problems in the prior art, enabling diagnosis and service of mobile devices without the high latency and high bandwidth of known remote control technology and without the risk of exposure of mobile device user personal content, information or applications. A service agent or customer care agent is able to see what the mobile device user sees on the user mobile device without a screen or display streamer. At least two instances of a diagnostics application run independently. One at the user mobile device and one either at a server or at the customer care agent terminal. Only diagnostics data is transmitted between the user mobile device and the customer care agent terminal. As such, bandwidth usage and resource limitations are reduced.

Additional aspects, advantages, features and objects of the present disclosure will be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

Network Environment

Figure 1:
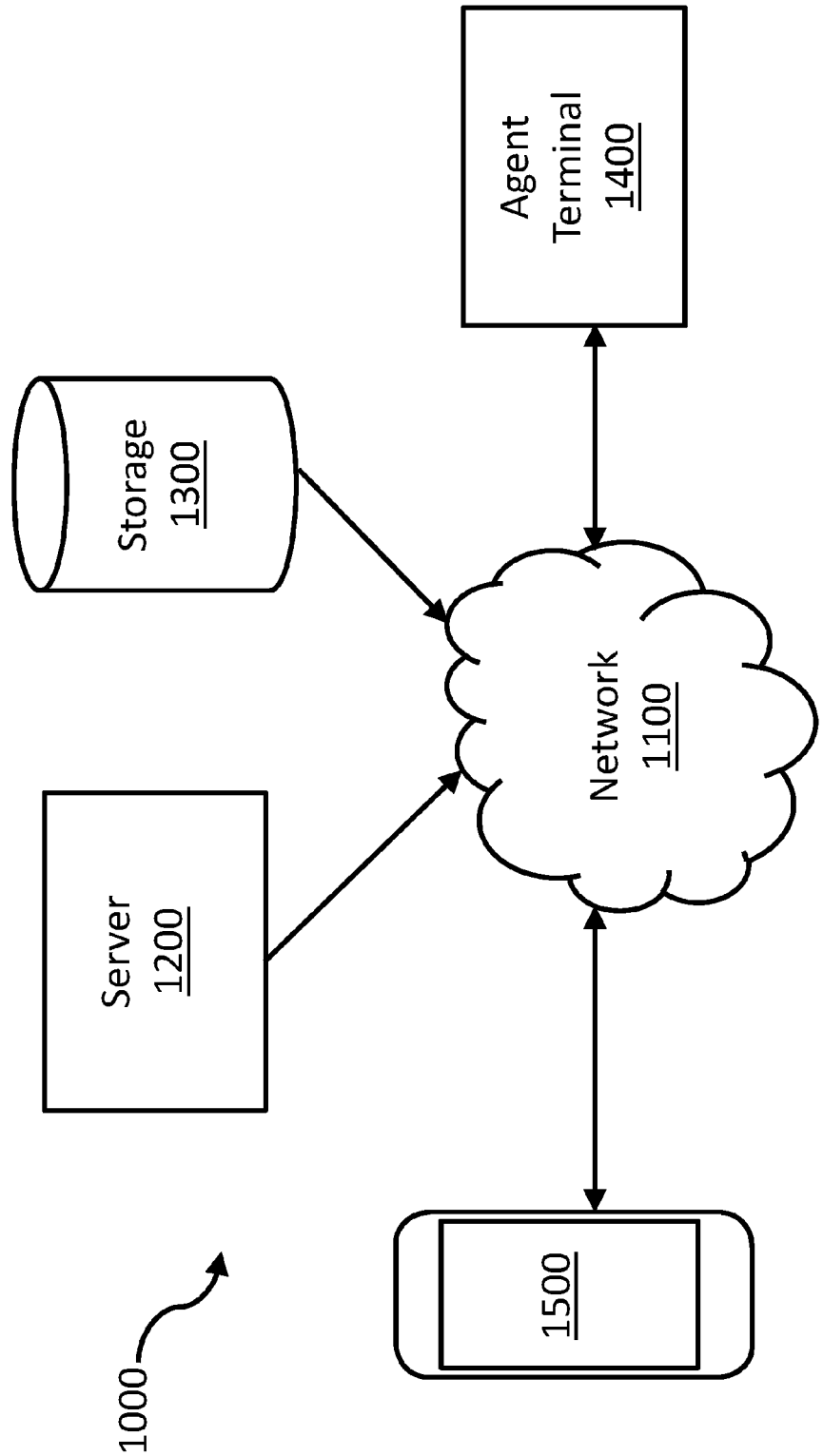
FIG. 1 illustrates an example network environment usable for supporting systems and methods of the disclosure.

Referring to FIG. 1, an example network environment 1000 suitable for practicing embodiments of the disclosure may include one or more data processing units including, for example, one or more data processing units 1400 and one or more data processing units 1500. Network environment 1000 may also include a server 1200 and a storage 1300 associated with server 1200.

Network environment 1000 may be implemented in various ways, depending on various possible scenarios. In one example scenario, network environment 1000 may be implemented by way of a spatially collocated arrangement of server 1200 and storage 1300. In another example scenario, network environment 1000 may be implemented by way of a spatially distributed arrangement of server 1200 and storage 1300 coupled mutually in communication via a communication network 1100. In yet another example scenario, server 1200 and storage 1300 may be implemented via cloud computing services.

Data processing units 1400 and 1500 are coupled in communication with server 1200 via communication network 1100. Communication network 1100 can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), Wireless MANs (WMANs), the Internet, second generation (2G) telecommunication networks, third generation (3G) telecommunication networks, fourth generation (4G) telecommunication networks, and Worldwide Interoperability for Microwave Access (WiMAX) networks.

Network environment 1000 is suitable for implementing various systems for providing service to a mobile device. In order to implement such systems, server 1200 provides a service to data processing units 1400 and 1500, while storage 1300 stores data related to mobile device diagnostics, mobile device user diagnostics screens, customer care agent diagnostics screens or any combination of these.

Data processing units 1400 and 1500 may access server 1200 to download one or more software products associated with the mobile device service such as, for example, a diagnostics application. In one embodiment, a system for a mobile device service is arranged in a manner that its functionality is implemented partly in one or more of data processing units 1400 and 1500 and partly in server 1200.

In an embodiment, the system is arranged in a manner such that its functionality is implemented substantially in data processing units 1400 and 1500 by way of downloaded software products such as, for example, a diagnostics application. In such an embodiment, data processing units 1400 and 1500 may be coupled to server 1200 periodically or randomly from time to time, for example, to receive updates from server 1200 and/or to upload thereto status or data including diagnostics data for storing at storage 1300 or transmission to customer care agent terminal 1400.

In yet another embodiment, the system is arranged in a manner that its functionality is implemented substantially in server 1200, for example, by way of one or more web browsers installed to data processing unit 1400, data processing unit 1500, one or more other data processing units or a combination of these.

The mobile device service can be offered free of cost or, alternatively, can be a paid service that has a subscription-based billing or a transaction-based billing, such as pay-per-use and/or pay-per-feature.

Network environment 1000 described herein is merely an example, which should not unduly limit the scope of the claims included herein. It is to be understood that the specific designation for network environment 1000 is provided as an example and is not to be construed as limiting the network environment to specific numbers, types, or arrangements of data processing units, servers, databases and communication networks. A person skilled in the art will recognize many variations, alternatives, and modifications of embodiments of the present disclosure.

Care Agent Terminal

Figure 2:
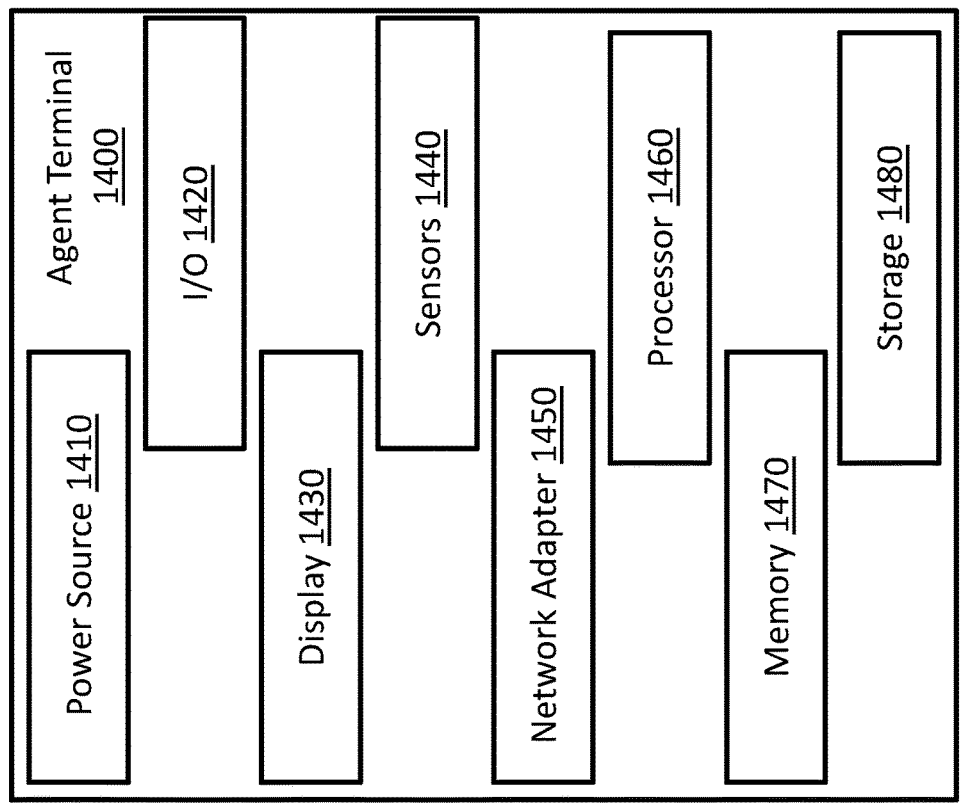
FIG. 2 illustrates a schematic of an example customer care agent terminal usable with systems and method of the disclosure.

In accordance with an embodiment of the disclosure a first data processing unit may be implemented as a customer care agent terminal 1400. Referring to FIG. 2, customer care agent terminal 1400 includes, but is not limited to, a memory 1470, computing hardware such as a processor 1460, Input/Output (I/O) devices 1420, a network adapter 1450, a configuration of sensors 1440, a storage 1480, a display 1430 and a system bus (not shown) that operatively couples various components including memory 1470, processor 1460, I/O devices 1420, network adapter 1450, sensors 1440, display 1430 and storage 1480.

Customer care agent terminal 1400 also includes a power source 1410 for supplying electrical power to the various components. The power source, for example, may include a rechargeable battery or may receive power from an outside source as by converting alternating current from a residential or industrial wall outlet to direct current.

Customer care agent terminal memory 1470 optionally includes non-removable memory, removable memory, or a combination thereof. The non-removable memory, for example, includes Random-Access Memory (RAM), Read-Only Memory (ROM), flash memory, or a hard drive. The removable memory, for example, includes flash memory cards, memory sticks, or smart cards.

Figure 3A:
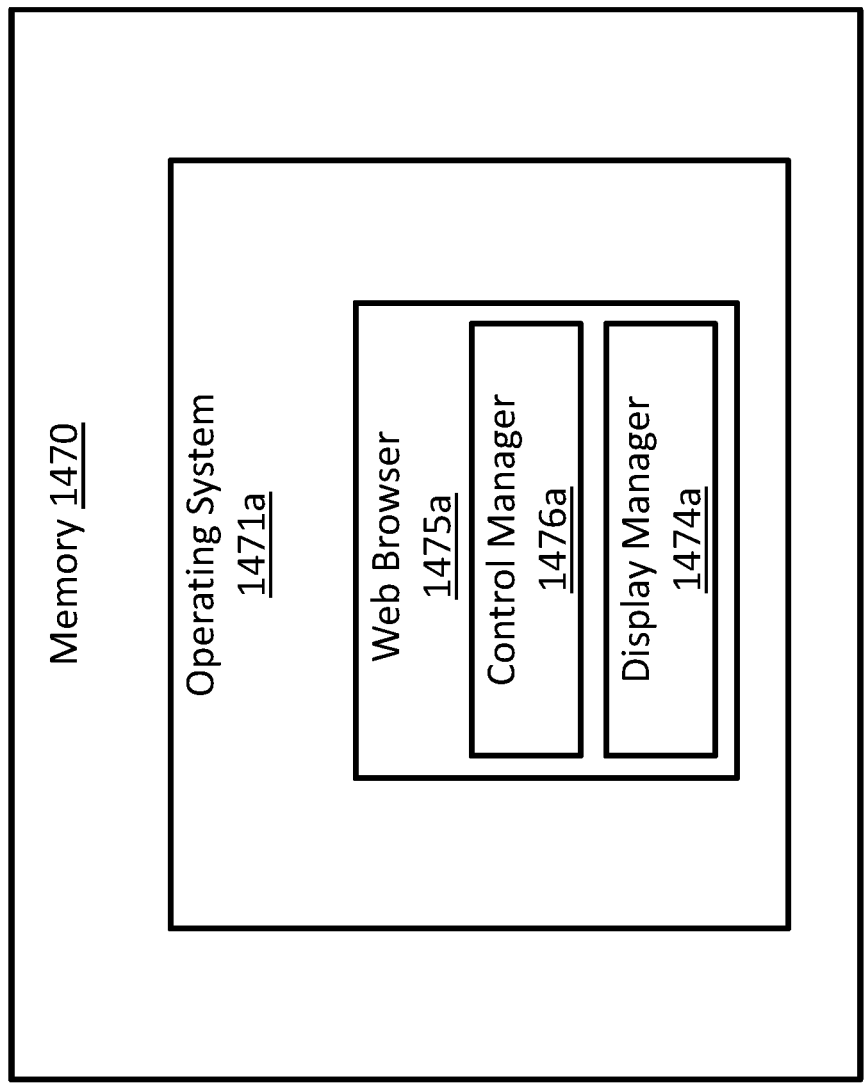
FIG. 3A illustrates a schematic of an example customer care agent terminal memory having installed thereon, a web browser through which a customer care agent may engage a diagnostics application in accordance with the disclosure.

Referring to FIG. 3A, customer care agent terminal memory 1470 or other memory of customer care agent terminal stores, for example, a web browser 1475a, which may, for example, support parts of a software product associated with the mobile device service. Executing the software product through a web browser 1475a with the customer care agent terminal processor 1460, in part, results in generating and rendering a graphical user interface (described below) on display 1430 to facilitate customer care agent interactions with the mobile device service. Such execution may further cause action by one or more of the other various components of customer care agent terminal 1400 and, further, may cause various inputs to a user mobile device (described below). In an example, web browser 1475a runs on or is interpreted by operating system 1471a. Plug-ins to the web browser may include a control manager 1476a which manages input provided by a customer care agent in order to control a mobile device user graphical user interface and send control information to the user mobile device as well as a display manager 1474a which manages display of a customer care agent graphical user interface and, in some instances, facilitates display of user mobile device graphical user interfaces.

In some examples, customer care agent terminal display 1430 (FIG. 2) may be a touch-sensitive display screen that is operable to receive tactile inputs from a customer care agent. These tactile inputs may, for example, include clicking, tapping, pointing, moving, pressing and/or swiping with a finger or a touch-sensitive object like a pen.

Customer care agent terminal I/O devices 1420 may include a mouse or a joystick that is operable to receive inputs corresponding to clicking, pointing, and/or moving a pointer object on the graphical user interface. Customer care agent terminal I/O devices 1420 may also include a keyboard that is operable to receive inputs corresponding to pushing certain buttons on the keyboard. Additionally, customer care agent terminal I/O devices 1420 may also include a microphone for receiving an audio input from the customer care agent, and a speaker for providing an audio output to the customer care agent.

Moreover, customer care agent terminal sensors 1440 may include one or more of: a multimeter, an accelerometer, a magnetometer, a pressure sensor, a temperature sensor, a gyroscopic sensor, a Global Positioning System (GPS) sensor, or a timer. A timer included as part of sensors 1440 may for example, enable inclusion of time-stamps with diagnostics data.

In some examples, a web browser 1475*a* (FIG. 3) executing on customer care agent terminal 1400 may be interfaced with customer care agent terminal sensors 1440 such that when executed on customer care agent terminal processor 1460, the web browser or one or more plug-ins to the browser are configured to resolve and integrate the outputs of sensors 1440 into useful information about, for example, mobile device performance. In particular, the mobile device having a performance measurement may be user mobile device 1500.

Furthermore, customer care agent terminal network adapter 1450 optionally allows a customer care agent using customer care agent terminal 1400 to transmit data to server 1200 (FIG. 1), for example, via communication network 1100. Additionally, customer care agent terminal network adapter 1450 may allow a customer care agent to access server 1200 with customer care agent terminal 1400 to update the web browser and/or download one or more new applications associated with a mobile device service. Moreover, network adapter 1450 optionally allows customer care agent terminal 1400 to communicate with other data processing units such as user mobile device 1500, for example, via communication network 1100.

Customer care agent terminal 1400 is optionally implemented by way of at least one of: a mobile phone, smart telephone, Mobile Internet Device (MID), tablet computer, Ultra-Mobile Personal Computer (UMPC), phablet computer, Personal Digital Assistant (PDA), web pad, Personal Computer (PC), handheld PC, laptop computer, desktop computer, Network-Attached Storage (NAS) device, large-sized touch screen with embedded PC, and interactive entertainment device, such as a game console, Television (TV) set and Set-Top Box (STB).

Figure 3B:
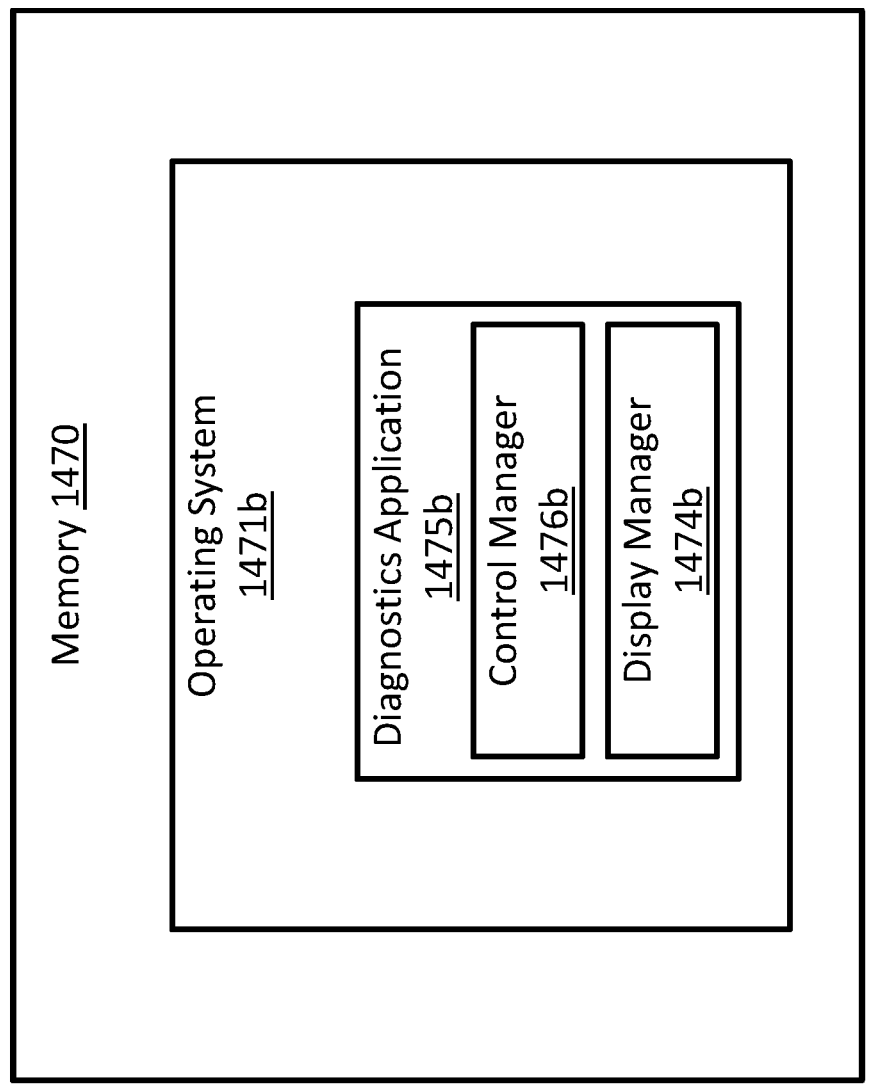
FIG. 3B illustrates a schematic of an example customer care agent terminal memory having installed thereon, a customer care agent diagnostics application.

Referring to FIG. 3B, in another example, a mobile device service system is implemented with an installation of a customer care agent application 1475*b* directly to operating system 1471*b* of customer care agent terminal 1400. Executing the software product through a operating system 1471*b* with the customer care agent terminal processor 1460 like the above example, in part, results in generating and rendering a graphical user interface (described below) on display 1430 to facilitate customer care agent interactions with the mobile device service. Such execution may further cause action by one or more of the other various components of customer care agent terminal 1400 and, further, may cause various inputs to a user mobile device (described below). In an example, customer care agent diagnostics application 1475*b* runs on or is interpreted by operating system 1471*b* and includes a control manager 1476*b* which manages input provided by a customer care agent in order to control a mobile device user graphical user interface and send control information to the user mobile device as well as a display manager 1474*b* which manages display of a customer care agent graphical user interface and, in some instances, facilitates display of user mobile device graphical user interfaces.

The disclosed customer care agent terminal 1400 as well as configurations of memory 1470 as represented in FIGS. 3A and 3B are merely examples, which should not unduly limit the scope of the claims. It is to be understood that the specific designation for customer care agent terminal 1400, memory 1470, web browser 1475*a* and customer care agent diagnostics application 1475*b* are provided as examples and are not to be construed as limiting customer care agent terminal 1400, memory 1470, web browser 1475*a* or customer care agent diagnostics application 1475*b* to specific numbers, types, or arrangements of modules and/or components. A person skilled in the art will recognize many variations, alternatives, and modifications of embodiments of the present disclosure.

User Mobile Device

Figure 4:
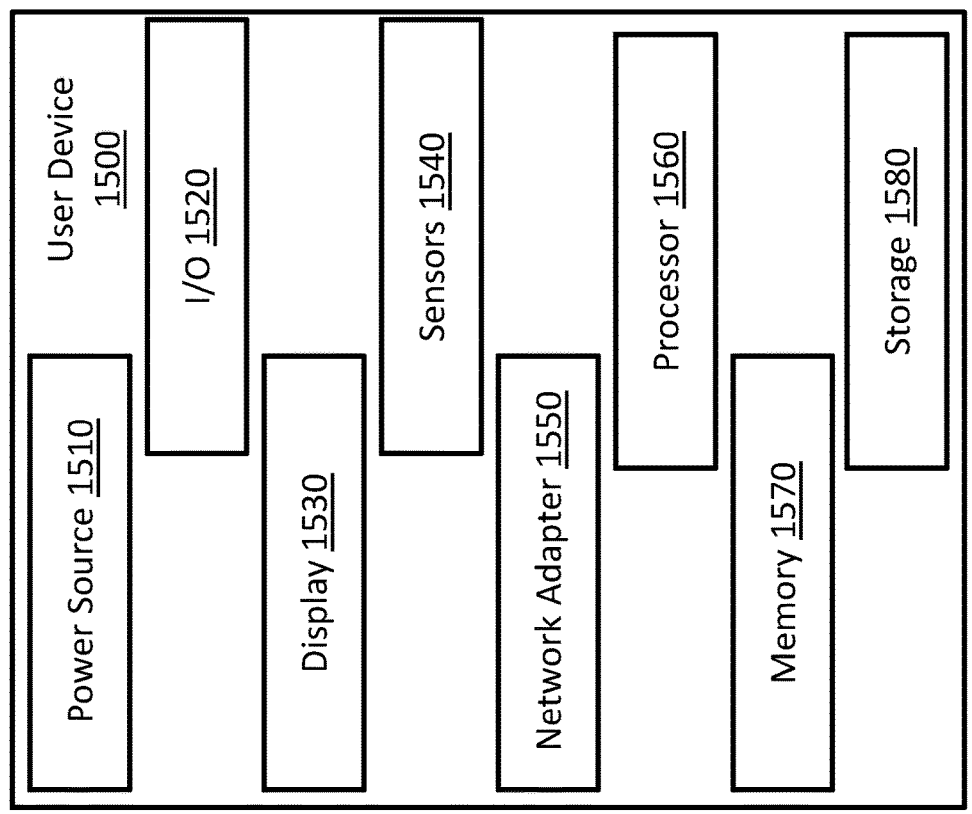
FIG. 4 illustrates a schematic of an example user mobile device usable with systems and methods of the disclosure.

In accordance with an embodiment of the present disclosure, another data processing unit may be implemented as a user mobile device 1500. Referring to FIG. 4, an example user mobile device 1500 may include but is not limited to, a memory 1570, computing hardware such as a processor 1560, Input/Output (I/O) devices 1520, a network adapter 1550, a configuration of sensors 1540, a storage 1580, a display 1530 and a system bus (not shown) that operatively couples various components including memory 1570, processor 1560, I/O devices 1520, network adapter 1550, sensors 1540, display 1530 and storage 1580.

User mobile device 1500 may also include a power source 1510 for supplying electrical power to the various components. The power source, for example, may include a rechargeable battery or may receive power from an outside source as by converting alternating current from a residential or industrial wall outlet to direct current.

User mobile device memory 1570 optionally includes non-removable memory, removable memory, or a combination thereof. The non-removable memory, for example, includes Random-Access Memory (RAM), Read-Only Memory (ROM), flash memory, or a hard drive. The removable memory, for example, may include flash memory cards, memory sticks, or smart cards.

Figure 5:
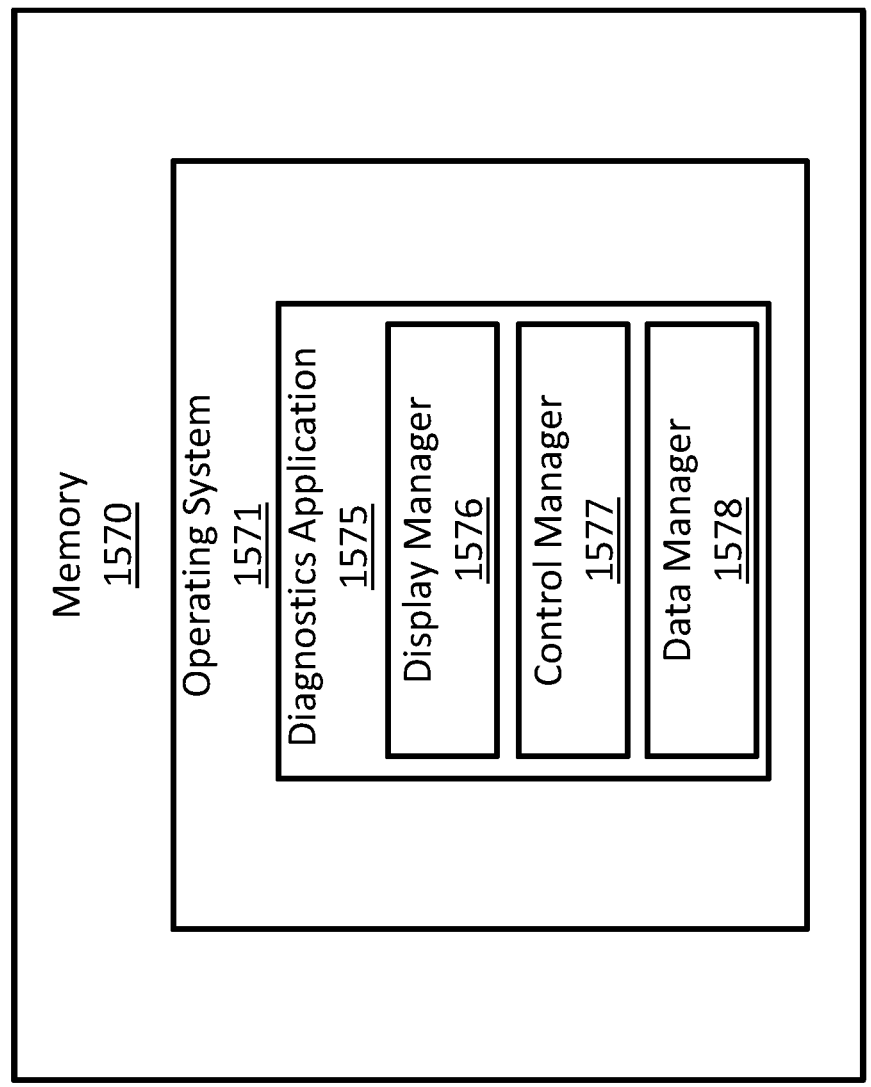
FIG. 5 illustrates a schematic of an example user mobile device memory having installed thereon, a diagnostics application in accordance with the disclosure.

Referring to FIG. 5, user mobile device memory 1570 or other memory of user mobile device 1500 may store a diagnostics application 1575 as well as user applications (not shown). Diagnostics application 1575 may, for example, be part of a software product associated with the mobile device service. Executing the software product on user mobile device processor 1560 (FIG. 4), for example as interpreted by operating system 1571, results in generating and rendering a graphical user interface, described below, on display 1530 to facilitate user interactions with the mobile device service and a customer care agent. Generating and rendering a graphical user interface to display 1530 may be managed by a display manager 1576 of diagnostics application 1575 while diagnostics and other data is managed by data manager 1578 and control of one or more components of user mobile device 1500 needed for the mobile device service is handled with control manager 1577.

In some examples, user mobile device display 1530 (FIG. 4) may be a touch-sensitive display screen that is operable to receive tactile inputs from the user. These tactile inputs may, for example, include clicking, tapping, pointing, moving, pressing and/or swiping with a finger or a touch-sensitive object like a pen.

User mobile device I/O devices 1520 may include a mouse or a joystick that is operable to receive inputs corresponding to clicking, pointing, and/or moving a pointer object on the graphical user interface. The user mobile device I/O devices may also include a keyboard that is operable to receive inputs corresponding to pushing certain buttons on the keyboard. Additionally, user mobile device I/O devices 1520 may also include a microphone for receiving an audio input from the user, and a speaker for providing an audio output to the user.

Moreover, user mobile device sensors 1540 may include one or more of: a multimeter, an accelerometer, a magnetometer, a pressure sensor, a temperature sensor, a gyroscopic sensor, a Global Positioning System (GPS) sensor, or a timer which may be used to measure and collect data related to performance of the user mobile device and surroundings of the user mobile device. Additionally, outputs generated by sensors 1520 may, for example, be indicative of user mobile device diagnostics data. A timer included as part of sensors 1520 may, for example, enable inclusion of time-stamps with diagnostics data.

In some examples, diagnostics application 1575 may be interfaced with user mobile device sensors 1520 such that when executed on user mobile device processor 1560, diagnostics application 1575 is configured to resolve and integrate outputs of sensors 1520 into useful information about, for example, user mobile device performance.

Furthermore, network adapter 1530 optionally allows a user of user mobile device 1500 to upload or otherwise transmit diagnostics data to server 1200, for example, via communication network 1100. Additionally, network adapter 1550 may allow user mobile device 1500 to access server 1200 to download diagnostics application 1575, update diagnostics application 1575, download one or more new applications, receive control input from customer care agent terminal 1400 or a combination of these. Moreover, network adapter 1550 optionally allows a user of user mobile device 1500 to communicate with other data processing units such as customer care agent terminal 1400, for example, via communication network 1100.

In an example, either or both of the user's diagnostics application 1575 or the customer care agent's diagnostics application may be a browser-based web application which executes within a web browser of the user mobile device, the customer care agent's terminal or both. As such, either or both instances of the diagnostics application could be offered as a software as a service (SaaS) program.

Further, the disclosed user mobile device 1500 as well as the configuration of memory 1570 as depicted in FIG. 5 are merely examples, which should not unduly limit the scope of the claims. It is to be understood that the specific designation for user mobile device 1500, memory 1570 and user diagnostics application 1575 are provided as examples and are not to be construed as limiting user mobile device 1500, memory 1570 or user diagnostics application 1575 to specific numbers, types, or arrangements of modules and/or components. A person skilled in the art will recognize many variations, alternatives, and modifications of embodiments of the present disclosure. User mobile device 1500 is optionally implemented by way of at least one of: a mobile phone, a smart telephone, an MID, a tablet computer, a UMPC, a phablet computer, a PDA, a web pad, a handheld PC, a laptop computer, and an interactive entertainment device.

Mobile Device Service

Figure 6:
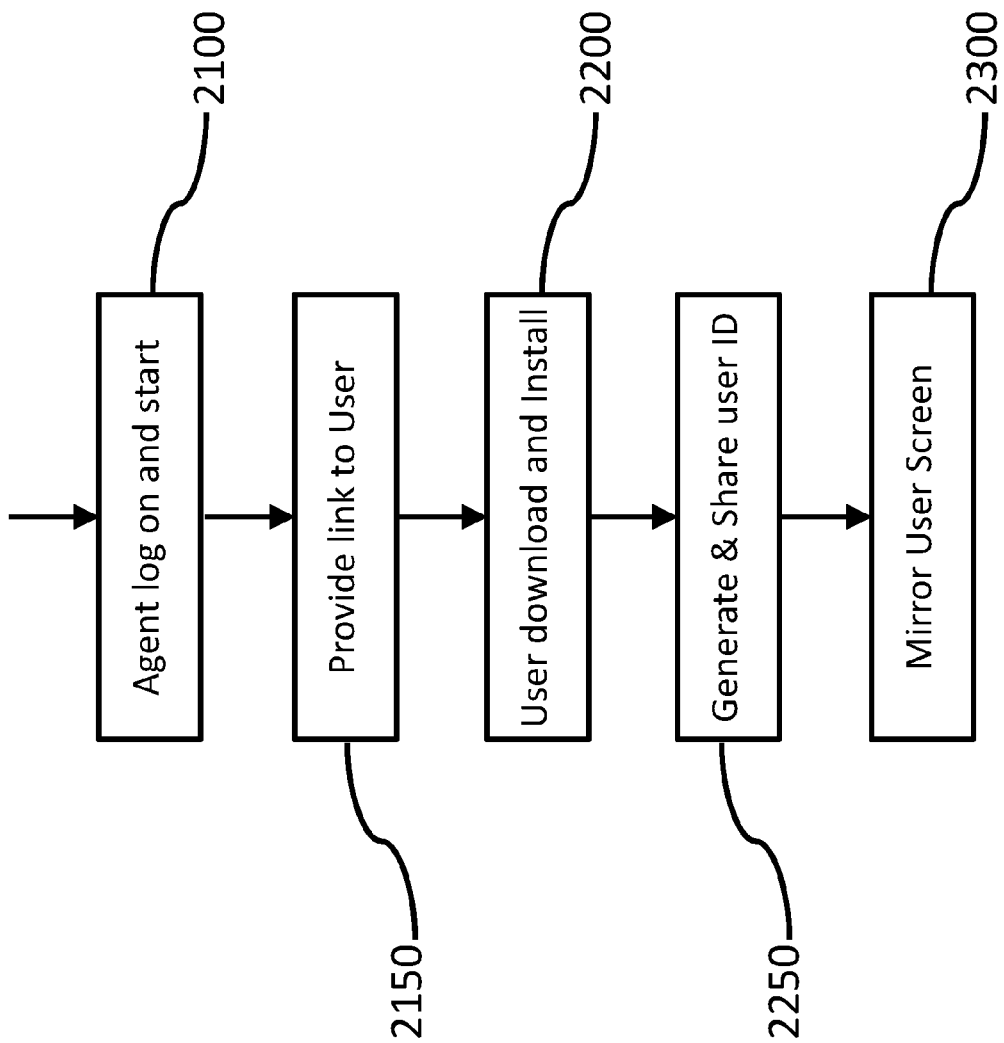
FIGS. 6 & 7 illustrate an example mobile device service method in accordance with the disclosure.
Figure 7:
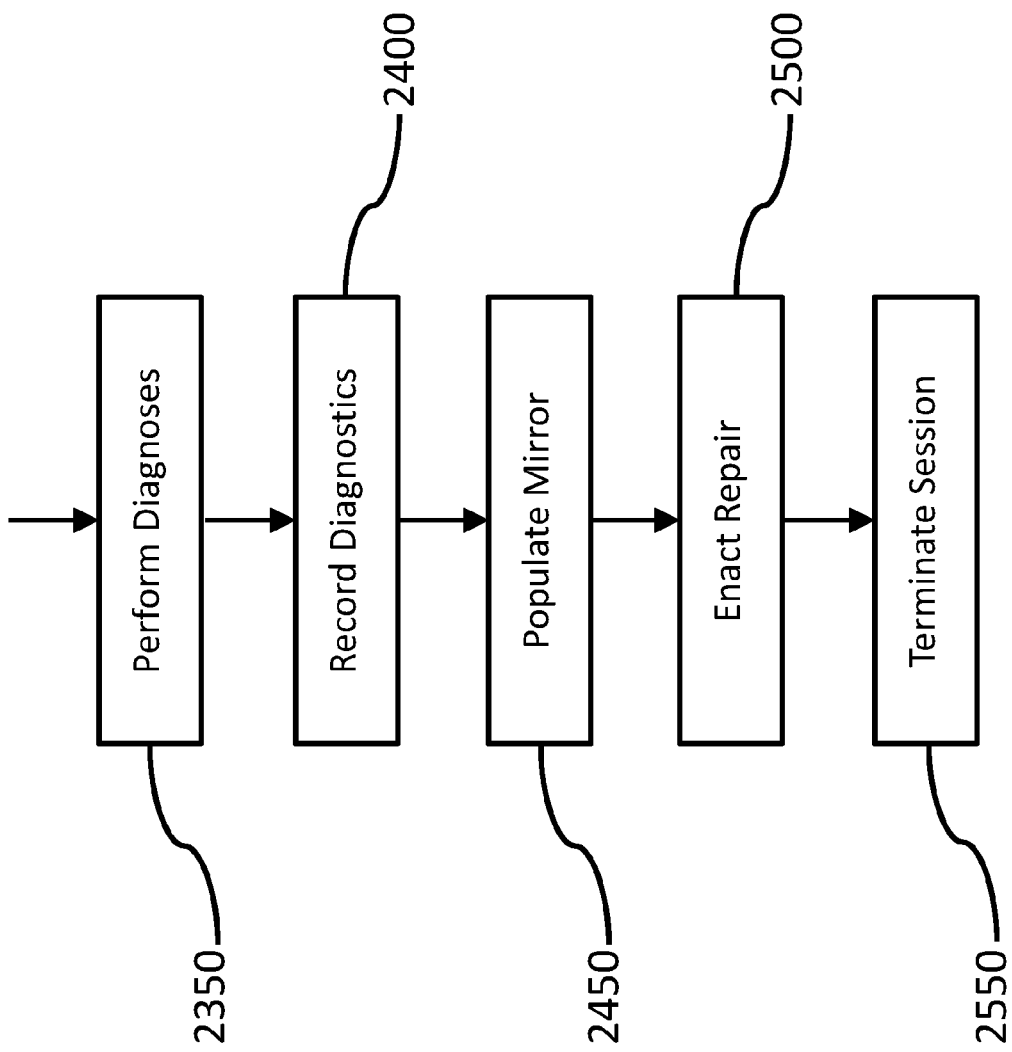

Upon experiencing a problem with his or her mobile device, a mobile device user contacts a customer care agent to report a problem and identify the mobile device with which the user is experiencing the problem. The user may contact the customer care agent by cellular network using the user mobile device, by cellular network using another mobile device or through by a wired telephone connection using a landline phone. Referring to FIGS. 6 & 7, the customer care agent logs on to the mobile device service system at 2100 in order to provide a mobile device service to the user. In some examples, the customer care agent logs on prior to receiving a call from a user while in other examples, the customer care agent logs on in response to the user's call.

The customer care agent inputs one or more pieces of identifying information for the user's mobile device for example, type, make, model, serial number, etc into the customer care agent diagnostics screen input windows. The customer care agent additionally inputs one or more types of contact data for the user for example a telephone number at which the user may receive short messaging service (SMS) messages or an e-mail address at which the user may receive electronic mail or both.

At 2150, using the telephone number or email address, as appropriate, the customer care agent causes a web, internet or other network address to be sent to the user. From this network address, the user may download one or more digital files necessary to install a diagnostics application to user mobile device 1500. In an example, the customer care agent sends a command including the user's telephone number or email address to server 1200 by inputting the same into one or more windows and server 1200 subsequently sends a message to user mobile device 1500 presenting the web, internet or other network address. In some scenarios, the user may be directed to the web, internet or other network address by care agent instructions provided over a voice call or in a voice mail message.

According to an example method for providing a user mobile device service, a remote instance of a diagnostics application, also referred to as a user diagnostics application, is downloaded from the address provided and installed to a user mobile device at 2200. User diagnostics application 1575, may be transmitted by server 1200 to user mobile device 1500 over a communications network. When installed to user mobile device 1500, user diagnostics application 1575 is configured to cause presentation of one or more of a number of diagnostics screens to display 1530 of user mobile device 1500. Using one or more of the diagnostics screens, the mobile device user may then proceed through one or more setup actions according to instructions from the customer care agent or according to one or more virtual assistants or instructions within user diagnostics application 1575.

Figure 8:
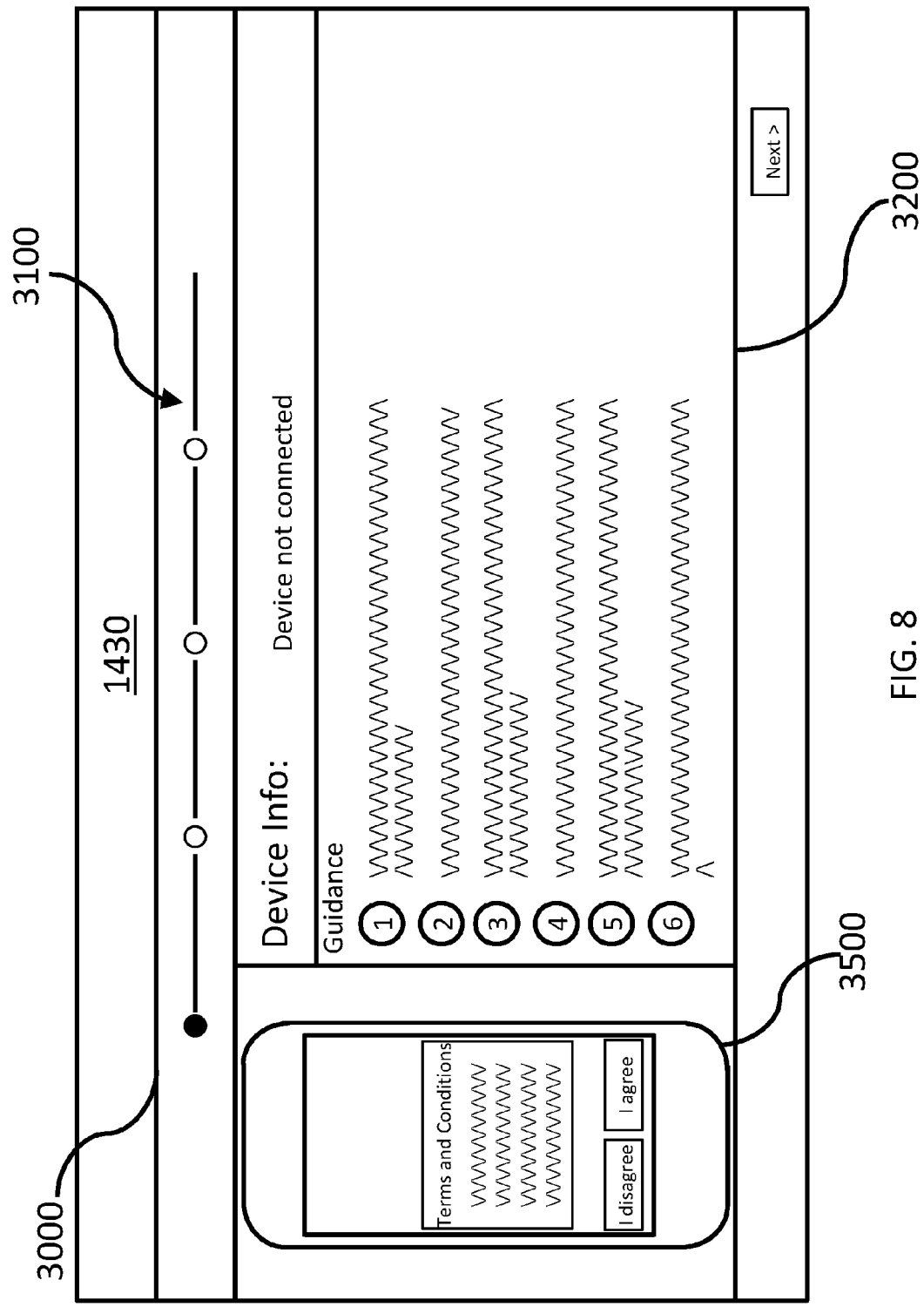
FIG. 8 illustrates an example customer care agent terminal in an instant during an example mobile device service method with an example user mobile device diagnostics screen mirrored on the left and example customer care agent instructions and controls provided to the right.

One example setup action may include agreeing to terms and conditions for use of the diagnostics application and for remote access of the user mobile device by one or more customer care agents. Referring to FIG. 8, an example of a customer care agent diagnostics screen or troubleshooting screen 3000 is presented to display 1430. A mirror 3500 of user mobile device diagnostics screen is displayed at a portion of troubleshooting screen 3000. Status line 3100 reflects an example stage of the mobile device service, 'Setup', is early in the service while window 3200 includes guidance to the customer care agent in the form of instructions. In some examples, since user mobile device 1500 and customer care agent terminal 1400 are not yet communicatively coupled, a mirror of user mobile device 1500 is not displayed at customer care agent terminal display 1430 until any or all setup actions have completed. Alternatively, one or more standard collections of graphics may be displayed in place of mirror 3500 including but not limited to a generic mobile device with, for example, terms and conditions text.

Another example setup action undertaken by a mobile device user receiving mobile device support through the mobile device service may include generating a user identification (ID) which, when shared with the customer care agent at 2250 and entered into an input window of the customer care agent diagnostics screen 3000, enables the customer care agent to connect to and provide remote input to user mobile device 1500. Input may be provided through, for example, communication network 1100 using customer care agent diagnostics screen 3000.

Figure 9:
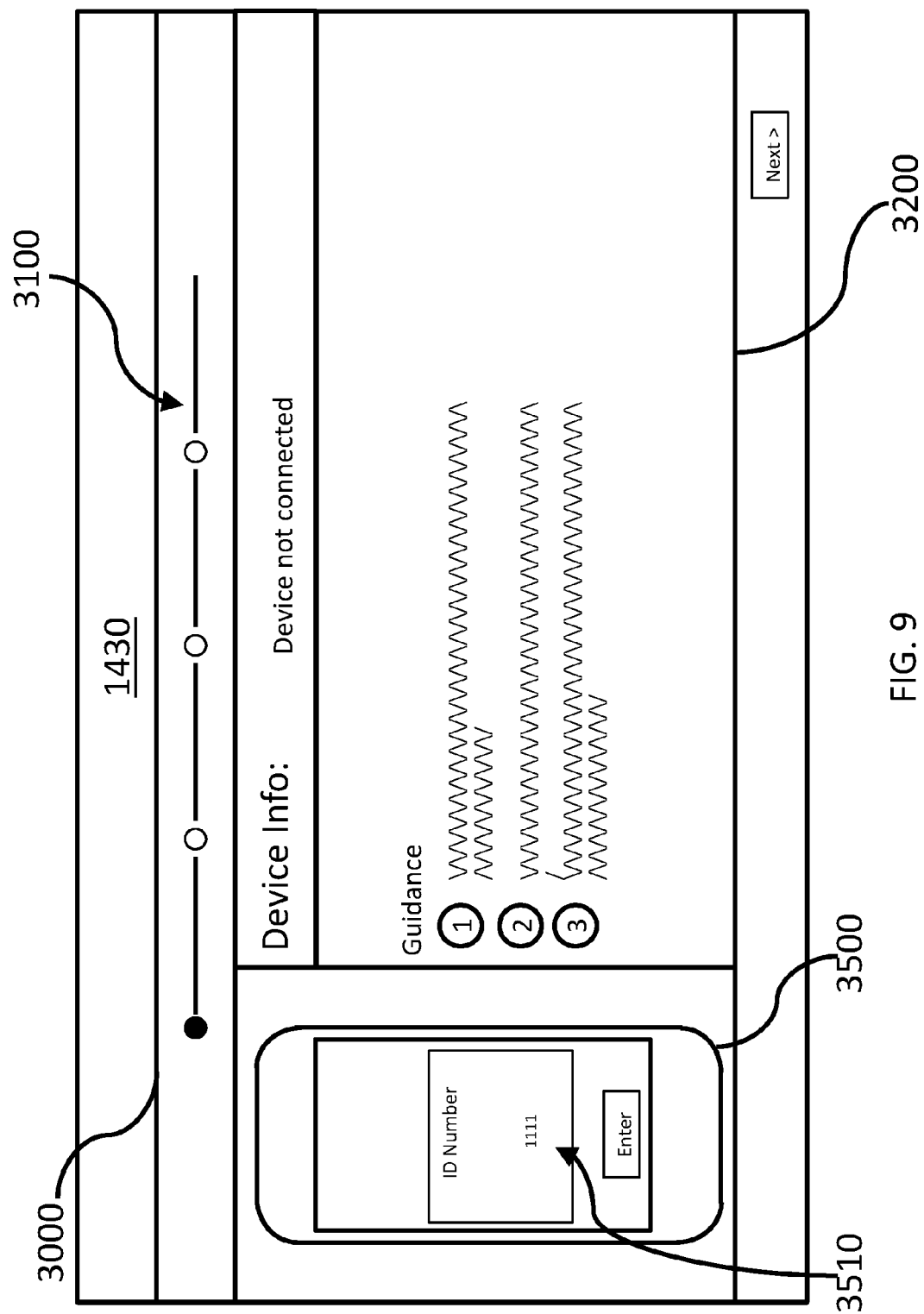
FIG. 9 illustrates an example customer care agent terminal in another instant during an example mobile device service method with an example user mobile device diagnostics screen mirrored on the left and example customer care agent instructions and controls provided to the right.

Referring to FIG. 9, an example customer care agent diagnostics screen 3000 is presented to display 1430. A mirror 3500 of user mobile device 1500 is displayed at a portion of troubleshooting screen 3000 and presents an ID 3510 which may be, for example, a series of characters including but not limited to letters, numbers and special characters. The customer care agent can send ID 3510 to server 1200 such that an authorization is transmitted to user mobile device. As with the above description of a terms and conditions screen the screen displayed to a customer care agent during input of ID 3510 may not include graphics of a live mirror of user mobile device diagnostics screens. For example, ID 3510 may only show on customer care agent diagnostics screen 3000 after the customer care agent has input ID 3510 through customer care agent terminal 1400.

Once the customer care agent inputs user ID 3510, at 2300 (FIG. 6) the customer care agent device 1400 and user mobile device 1500 are communicatively connected and graphics 3500 mirroring the user mobile device diagnostics screen as shown live on user mobile device 1500 will be displayed in a window of the customer care agent's diagnostics application 3000. In addition to graphics 3500 (FIG. 9) mirroring the user's diagnostics screen, the customer care agent diagnostics application may also display, for example adjacent to mirroring graphics 3500, one or more instructions 3200 for guiding the customer care agent through the processes of attending to the user's mobile device including but not limited to testing the user mobile device, troubleshooting the user mobile device, diagnosing the user mobile device or a combination of these. Furthermore, the transmitted authorization enables control of user mobile device 1500 with customer care agent terminal 1400, for example, by interacting with various buttons or other inputs presented to display 1430 as part of customer care agent diagnostics screen 3000. Communication between the mobile device user and the customer care agent can be through both WiFi and cellular network simultaneously.

With matters of setup properly addressed, the customer care agent is ready to perform diagnoses at 2350 (FIG. 7). A diagnostics screen 1535 is presented to the display of user mobile device 1500. Provided user mobile device 1500 and customer care agent terminal 1400 are communicatively coupled over network 1100, for example, through server 1200 and the parties are ready to perform diagnoses at 2350, the customer care agent is able to control user mobile device diagnostics application 1575 to perform diagnostic services on user mobile device 1500. For example, in response to an input selection made by the customer care agent using customer care agent terminal 1400 to create control input, an action is performed on user mobile device 1500 within the remote instance of diagnostics application 1575. Such actions may cause diagnostics tests to run and diagnostics data resulting from the diagnostics tests run to be recorded.

In an example, control input provided by customer care agent terminal 1400 (FIG. 1) through server 1200 to user mobile device 1500 is configured to control testing, troubleshooting or both of hardware components of user mobile device 1500, software components of user mobile device 1500 or both.

Control input may also be configured to control presentation of user diagnostics screens 1535 to display 1530 of user mobile device 1500 and to cause server 1200 to present customer care agent diagnostics screens to customer care agent terminal 1400 for implementing the customer care agent diagnostics application. As addressed in greater detail below, the manner of presenting customer care agent diagnostics screens 3000 to customer care agent terminal 1400 will depend on whether a browser-based version or native version of the customer care agent diagnostics application is being used. In browser-based implementation, server 1200 may send web pages to customer care agent terminal 1400 through web browser 1475. Regardless of the implementation, user diagnostics screen mirrors such as 3500 are synchronized with the corresponding user diagnostics screen so that a given mirror is provided to customer care agent diagnostics screens simultaneously or substantially simultaneously with presentation of the corresponding user diagnostics screen to the user display 1530.

When customer care agent terminal 1400 is connected with user mobile device 1500 and is able to provide input to user diagnostics application 1575, user mobile device 1500 may, in some examples, be unresponsive to any type of local user input to user mobile device 1500. For example, server 1200 may transmit, from customer care agent 1400 to user mobile device 1500, control input configured to cause user mobile device 1500 to ignore mobile device user input during a session of receiving control input from customer care agent terminal 1400 such that local input at user mobile device 1500 is prevented. In some examples, the mobile device user may be able to provide only certain limited types of input, for example, adjusting volume of an audio speaker or brightness of display 1530.

Duration of limited or prevented local input may include times when customer care agent terminal 1400 is being provided with graphics mirroring user diagnostics application 1575, when customer care agent terminal 1400 is being provided with user mobile device diagnostics data, when customer care agent 1400 is providing input to user mobile device 1500 or some combination of these. In an example, user mobile device 1500 may be limited or prevented from receiving local user input between the beginning of a mobile device service session when a customer care agent initiates control on user mobile device 1500 and termination of the mobile device service session when the customer care agent relinquishes control of user mobile device 1500.

Meanwhile, during the mobile device service, the customer care agent is prevented from controlling components of user mobile device 1500 which are not associated with, required for or necessary for diagnostics or troubleshooting pertaining to the mobile device service. In this context, components of user mobile device 1400 may be hardware, software or a combination thereof. In an example, the customer care agent may be prevented from providing input to successfully interact with user applications external to user diagnostics application 1575. In a further example, the customer care agent is not able to close or minimize diagnostics application 1575 without terminating the network connection with user mobile device 1500 that is needed for control and presentation of mirror 3500. Furthermore, user mobile device diagnostics application 1575 may include a privacy filter preventing personal mobile device user content from being mirrored to customer care agent diagnostics screen 3000. In this way customer care agent input is quarantined or encapsulated within user diagnostics application.

Figure 10:
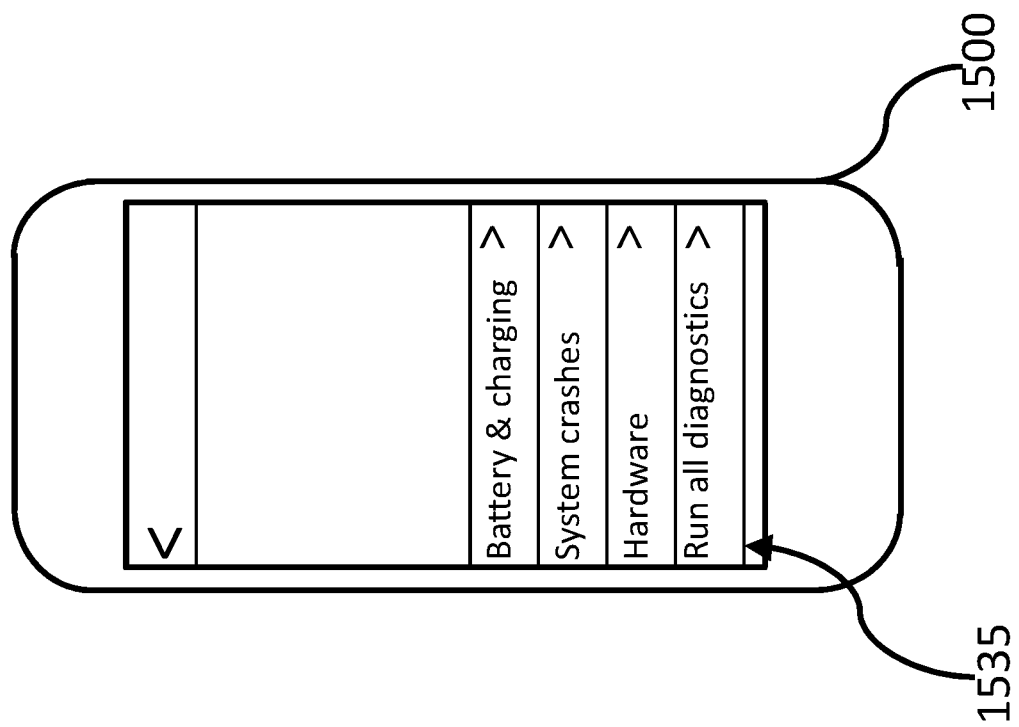
FIG. 10 illustrates an user mobile device in an instant during an example mobile device service method with an example beginning diagnostics screen presented to the display.
Figure 11:
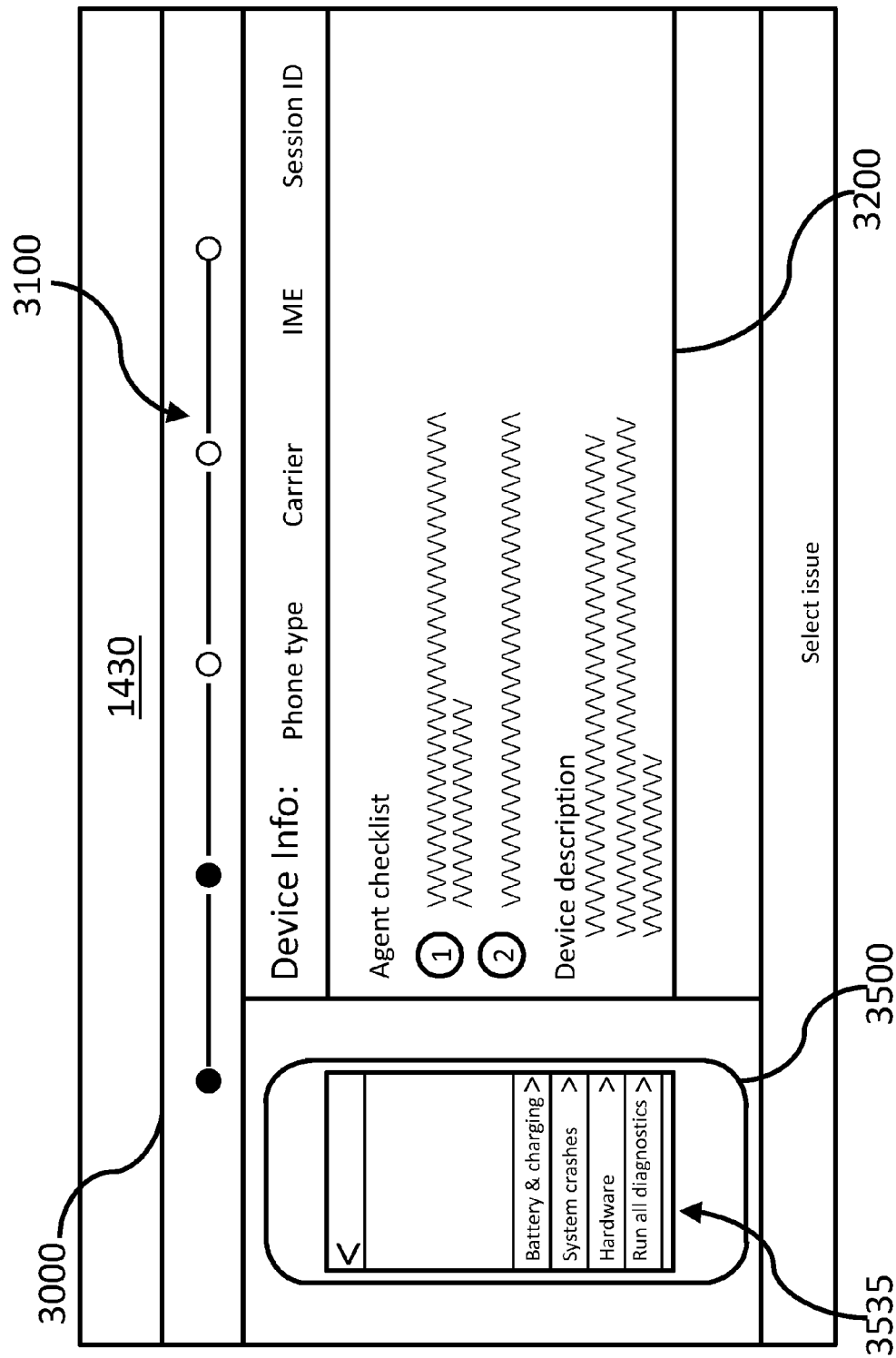
FIG. 11 illustrates an example display of a customer care agent terminal with the example user mobile device screen as illustrated in FIG. 10 mirrored on the left and example customer care agent instructions and controls provided to the right.

A beginning diagnostics screen 1535 (FIG. 10) is presented to display 1530 of user mobile device 1500 and mirrored at display 1430 of customer care agent terminal 1400 as graphics 3535 (FIG. 11). Beginning diagnostics screen 1535 and its mirror at 3535 include a number of broad categories of problems, issues or conditions that user mobile device 1400 may be experiencing. In an example, these categories are presented as virtual buttons which are selectable by the customer care agent at mirror 3500 to undertake troubleshooting activities for the selected category.

By providing various input, the customer care agent advances through screens of the customer care agent diagnostics application, providing input and viewing diagnostics data resulting from various diagnostic tests performed on aspects of hardware components of the user mobile device, aspects of software components of the user mobile device or both. During the diagnostics process, various diagnostics or troubleshooting screens are presented to display 1530 of user mobile device 1500. Regions of these screens of user mobile device 1500 are populated with or in accordance with diagnostics data recorded at 2400 (FIG. 7) which is the result of tests or diagnostics run in response to control input from the remote customer care agent at customer care agent terminal 1400.

Server 1200 receives, from user mobile device 1500 over communications network 1100, user mobile device diagnostics data generated and/or recorded by user mobile device 1500 in accordance with diagnostics tests. In accordance with 2400 (FIG. 7) diagnostics data may additionally be stored at user mobile device storage 1480, by server 1200 at storage 1300 or both of these.

Further, windows or other regions of troubleshooting screen mirror 3500 are populated at 2450 in accordance with the customer care agent diagnostics application based upon diagnostics data derived from the user mobile device through use of the remote user diagnostics application 1575.

To reduce latency during a mobile device service session, only small data packets are sent between user mobile device 1500, server 1200, and customer care agent terminal 1400. During an example setup phase, user mobile device 1500 only receives a message containing a link and an invitation to the user to visit a download source website, diagnostics application 1575 as a download 4115*a* and a control signal disabling user controls and enabling customer care agent control. During the same example setup phase, the customer care agent inputs only a command to send the user the message containing the user diagnostics application download link and user ID 3510 provided by the mobile device user.

Latency and bandwidth are similarly conserved during diagnostics phases of the mobile device service. In an example diagnostics phase implemented with a web browser and taking place after a setup phase, user mobile device 1500 receives only control input from and sends only diagnostics data to server 1200 while customer care agent terminal 1400 receives only web pages and transmits only control input.

User mobile device diagnostics data is transmitted from user mobile device 1500 to server 1200 for presentation to customer care agent terminal 1400 without any transmission of user mobile device display data. The mobile device service does not stream the user mobile device display graphics either to server 1200 or to customer care agent terminal 1400. In an example, user mobile device 1500 is actively prevented from transmitting graphics data of user diagnostics screens presented to user mobile device 1500. In other examples, either more or less data or greater or fewer signals are sent between user mobile device 1500, server 1200 and customer care agent terminal 1400.

Figure 12:
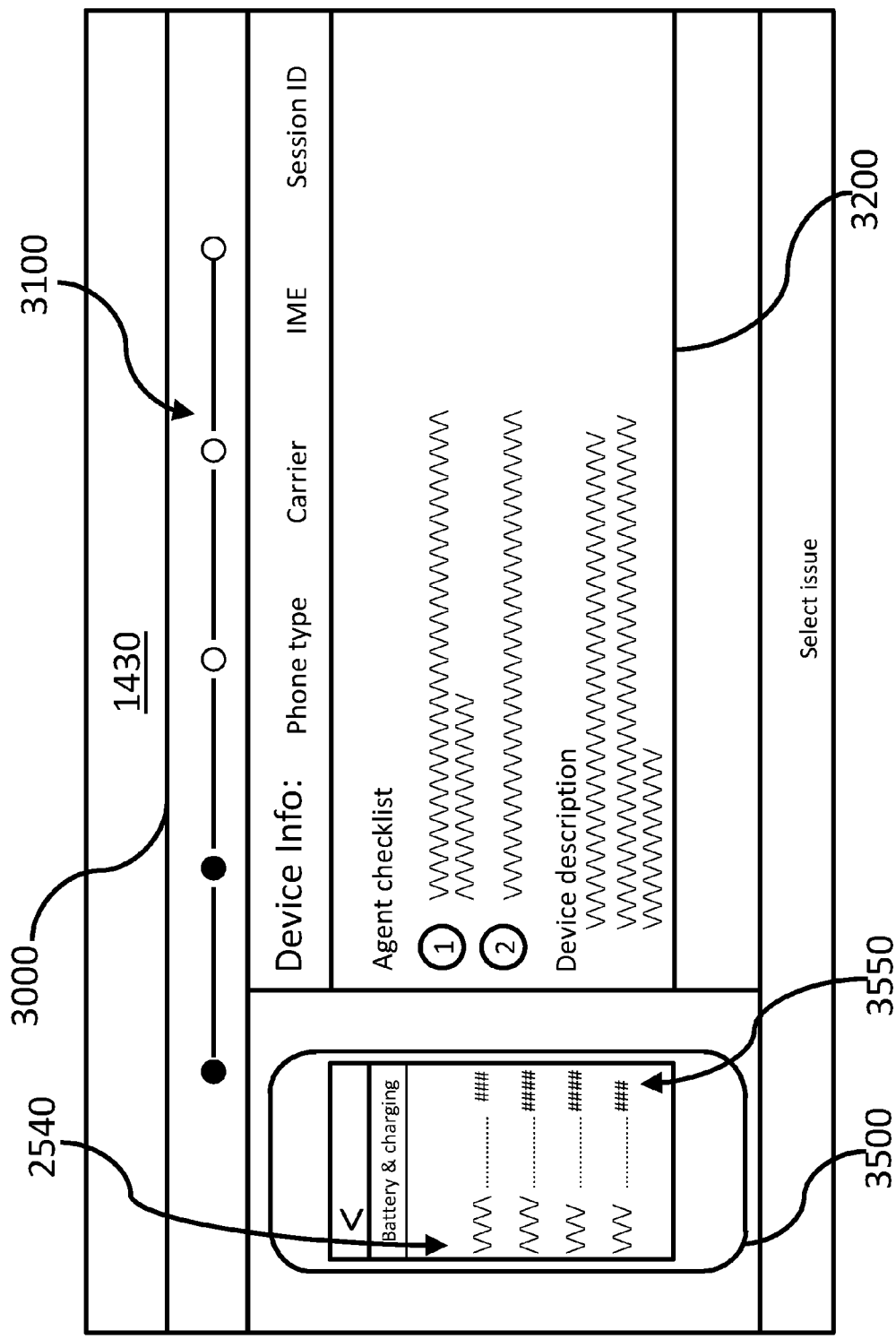
FIG. 12 illustrates an example display of a customer care agent terminal in another instant during an example mobile device service method with an example user mobile device diagnostics screen mirrored on the left and example customer care agent instructions and controls provided to the right.

The user diagnostics screen of the remote instance of the diagnostics application 1575 is mirrored to display 1430 of customer care agent terminal 1400 substantially synchronously with its presentation to user mobile device display 1530. User mobile device diagnostics data is transmitted from user mobile device 1500 to server 1200 for population to regions of mirrored user mobile device 3500 at customer care agent terminal 1400. Diagnostics data transmitted from user mobile device 1400 is entirely separable from any user diagnostics screen graphics and, depending on whether implemented by browser or native application, is either added to mirror 3500 at the customer care agent diagnostics screen 3000 presented to customer care agent display 1430 or added to html and/or script of a web page transmitted or otherwise provided by server 1200. Referring to FIG. 12, user diagnostics application mirror 3500 displays various diagnostics data values 3550 so as to correspond with diagnostics parameters 3540. For example, measuring a voltage parameter in accordance with a battery and charging tab, yields voltage diagnostics data.

In a browser-based customer care agent diagnostics application implementation, customer care agent terminal 1400 is provided with a first version of a customer care agent diagnostics page which includes mirror 3535 of the user diagnostics screen presented to display 1530 of user mobile device 1500. For example, at 2300 (FIG. 6) the first customer care agent diagnostics screen may include mirror 3500 with only parameters 3540 displayed since the diagnostic tests have yet to be performed. Once diagnostics tests are performed at 2350 (FIG. 7) and recorded at 2400, customer care agent terminal 1400, is subsequently provided at 2450 with a second version of the customer care agent diagnostics screen including the mirror of the user diagnostics screen populated with values 3550 representative of the diagnostics data received from user mobile device 1500.

According to 2500 (FIG. 7), equipped with diagnostics data from user mobile device 1500 presented in mirror 3500, the customer care agent is able to undertake the necessary repair. Necessary repair may include any of a variety of actions which overcome the problems the mobile device user experienced with user mobile device 1500 including but not limited to ordering a replacement part for user mobile device 1500 or replacing user mobile device 1500 entirely.

After diagnostics have been performed at 2350 and repairs have been undertaken at 2500, the mobile device service session may be terminated at 2550. With the session terminated, customer care agent terminal 1400 will no longer be enabled for remotely controlling user mobile device 1500 through customer care agent diagnostics application 1575, will no longer receive user mobile device diagnostics data through server 1200 and mirror 3500 will no longer be presented to display 1430 of customer care agent terminal 1400. In an example, generic graphics representative of user mobile device 1500 or some other user mobile device may be presented in the place of mirror 3500 after the session has been terminated.

Further, in an example, user diagnostics application 1575 automatically uninstalls upon termination of a service session. In another example, user diagnostics application 1575 remains installed to user mobile device 1500 until one or more uninstall actions are taken by the mobile device user or a customer care agent.

Actions described with reference to FIGS. 6-12 are only illustrative and other alternatives can also be provided where one or more actions are added, one or more actions are removed, or one or more actions are provided in a different sequence without departing from the scope of the claims herein.

Data Transmission in a Browser-based Implementation

Figure 13A:
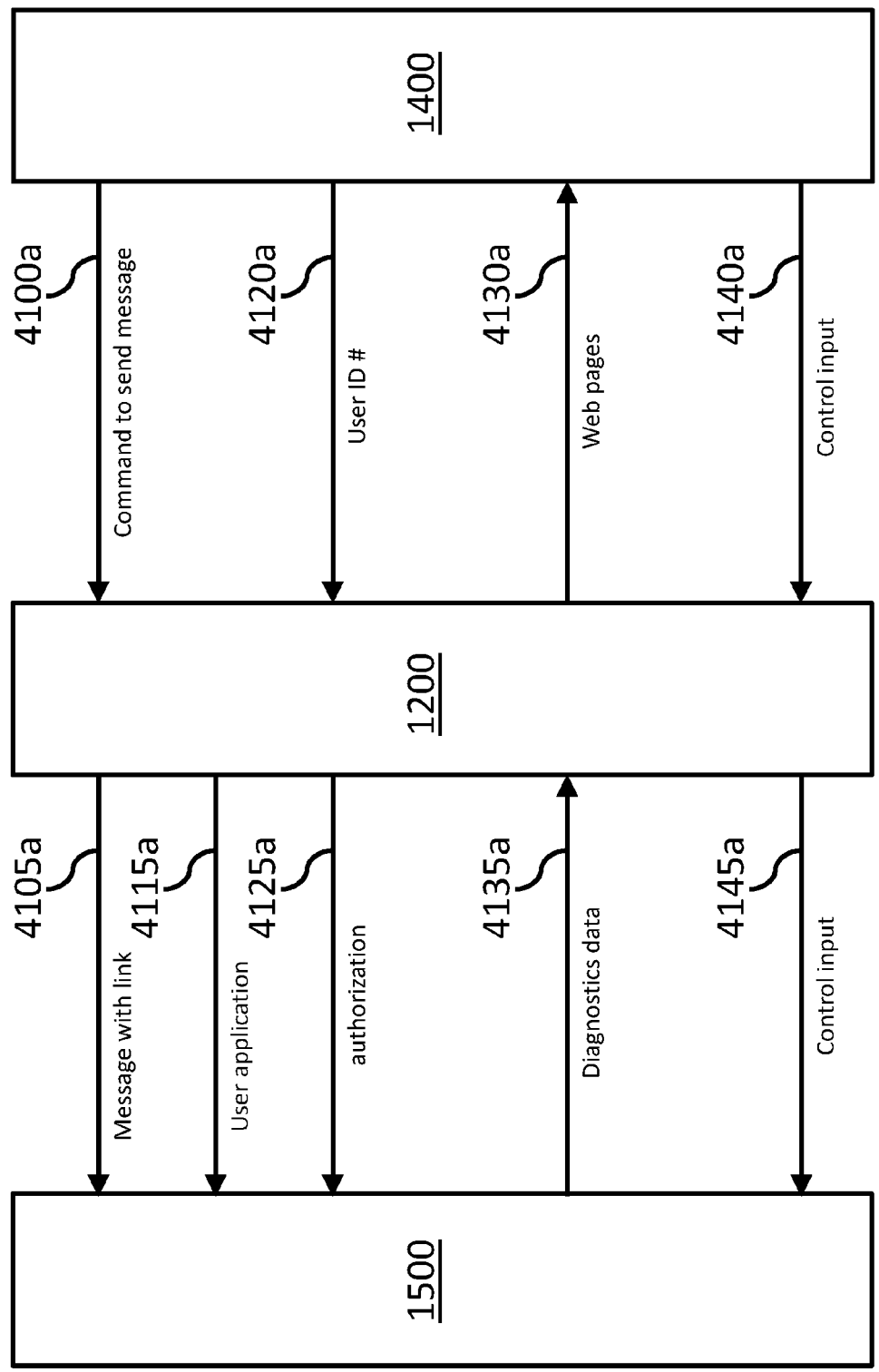
FIG. 13A diagrammatically illustrates example data transmissions among an example user mobile device, an example server and an example customer care agent according to a first embodiment.

As mentioned above, in order to reduce bandwidth and latency during a customer care session, data transmission between user mobile device 1500, server 1200, and customer care agent terminal 1400 is limited. Referring to FIG. 13A, in an example of a web browser-based implementation of the present mobile device service, the customer care agent sends a command 4100*a* to server 1200 to cause server 1200 to subsequently send a message 4105*a* to user mobile device 1500 presenting the web, internet or other network address at which mobile device user may download the user diagnostics application.

In examples in which a mobile device user downloads and installs a user diagnostics application, digital files 4115*a* representing user diagnostics application 1575, may be transmitted by server 1200 to user mobile device 1500. With the above-described user ID 3510 provided to a customer care agent it can be sent to server 1200 in a signal 4120*a* such that an authorization signal 4125*a* is in turn transmitted to user mobile device 1500.

Authorization 4125*a* enables control of user mobile device 1500 with customer care agent terminal 1400. For example, server 1200 may transmit, to the user mobile device, control input 4145*a* interpreted from control input 4140*a* of customer care agent terminal 1400. Control input 4145*a* is configured to control testing, troubleshooting or both of user mobile device 1500 as well as presentation of user diagnostics screens 1535 to display 1530 of user mobile device 1500. Control input 4140*a*, from which 4145*a* is derived, may also cause server 1200 to present customer care agent diagnostics screens, such as care agent diagnostics web pages 4130*a* to customer care agent terminal 1400 for implementing the customer care agent diagnostics application.

In response to control input 4145*a* to user mobile device 1500, server 1200 receives user mobile device diagnostics data 4135*a* generated and/or recorded by user mobile device 1500 in accordance with diagnostics tests. Mobile device diagnostics data 4135*a* is transmitted from user mobile device 1500 to server 1200 for presentation to customer care agent terminal 1400 without any transmission of user mobile device display data such that the mobile device service does not stream the user mobile device display graphics either to server 1200 or to customer care agent terminal 1400.

Web pages 4130*a* including mirrored user diagnostics screens and diagnostics data 4135*a* populated thereto are served to customer care agent terminal 1400 by server 1200. Example web pages transmitted to customer care agent terminal 1400 include a representation of user diagnostics application mirror 3500 (FIG. 12) with diagnostics data values 3550 populated thereto. The web pages may include, for example, html or html5 code and code written in one or more scripting or glue languages. In the example browser-based implementation, separate transmission of diagnostics data from server 1200 to customer care agent terminal 1400 is not necessary and transmission of graphics data from user mobile device 1500 is not needed.

Data Transmission in a Native-based Implementation

Figure 13B:
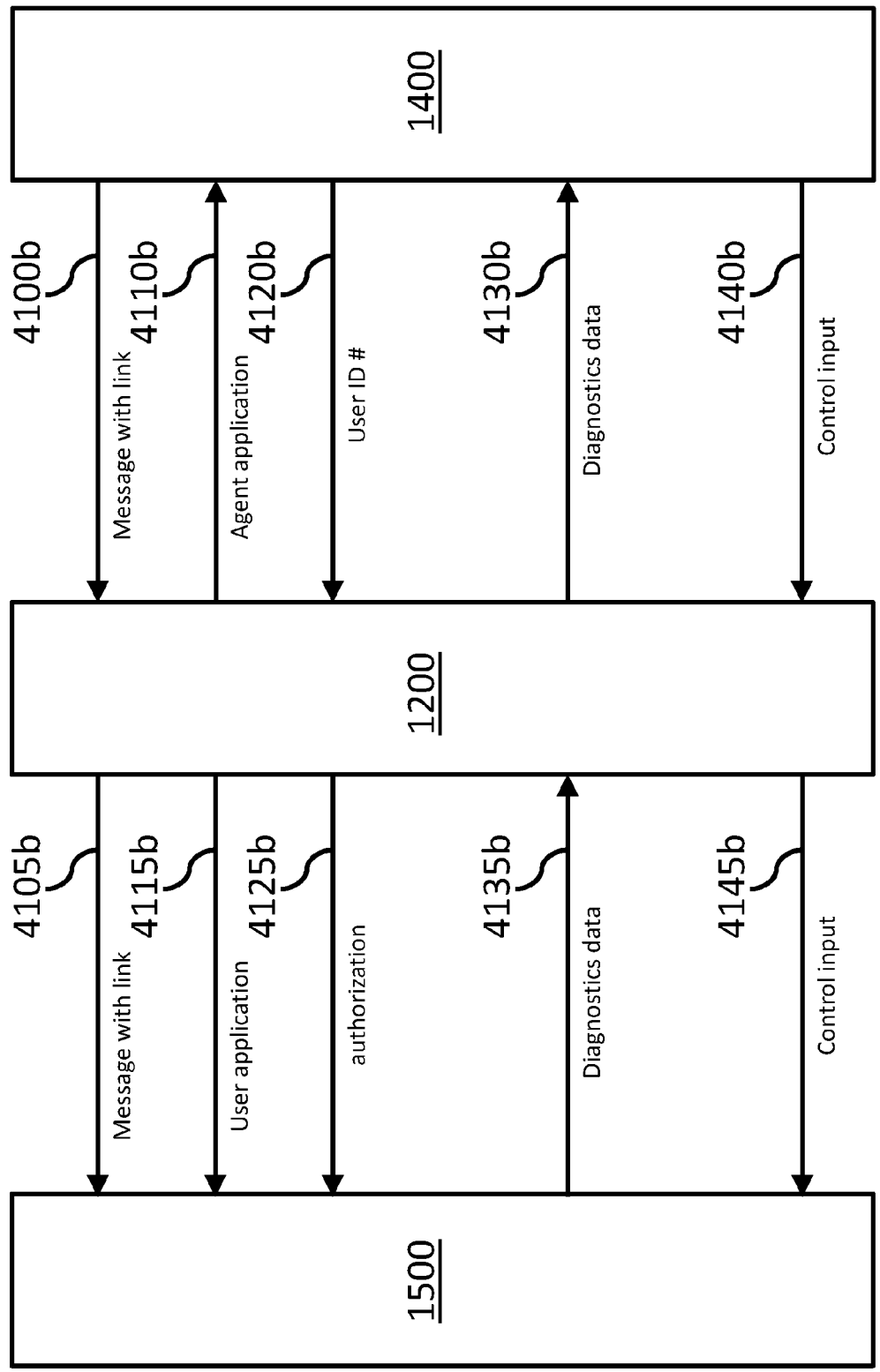
FIG. 13B diagrammatically illustrates example data transmissions among an example user mobile device, an example server and an example customer care agent according to a second embodiment.

Referring to FIG. 13B, details of an embodiment of a mobile device service implemented with an instance of a customer care agent diagnostics application installed to customer care agent terminal 1400 are described. In this native-application embodiment, a message 4100*b* is sent from customer care agent terminal 1400 to server 1200, for example through communications network 1100, so that server 1200, in response, sends user mobile device 1500 a message 4105*b* including a link or other web or network address at which a mobile device user may obtain a copy of user diagnostics application 1575 in accordance with transmission 4115*b*. Server 1200 may provide, for example by transmission through communications network 1100, a copy 4110*b* of customer care agent application 1475*b* either before or subsequent to sending of messages 4100*b* and 4105*b* and download of user mobile device application 1575.

When both the mobile device user and the customer care agent have their respective versions of the diagnostics application running, user ID 4120*b* is transmitted from customer care agent terminal 1400 to server 1200 to cause server 1200 to transmit one or more authorization signals 4125*b* to enable control of user mobile device diagnostics application 1575 by customer care agent terminal 1400 and future transmission of diagnostics data as 4135*b* from user mobile device 1500 to server 1200. Furthermore, signal 4130*b* transmitted to customer care agent terminal 1400 from server 1200 includes diagnostics data as well as some type of notification to customer care agent terminal 1400 reflecting which user diagnostics screen is being presented to user mobile device display 1530. In this way mirror 3500 presented to customer care agent display 1430 is synchronized with the equivalent user diagnostics screen. During the mobile device service, control input or control signals 4140*b* are transmitted from customer care agent terminal 1400 to server 1200 for interpretation and/or for further transmission to user mobile device 1500 as control signals 4145*b*.

As mentioned above with respect to reduced latency in the present service, after a setup phase, user mobile user mobile device 1500 receives only control input 4145*b* from and sends only diagnostics data 4135*b* to server 1200 while customer care agent terminal 1400 receives only a signal reflecting which user diagnostics screen to mirror and diagnostics data 4130*b* and sends only control input 4140*b*. User mobile device display data is not transmitted from user mobile device 1500 to server 1200.

As evident throughout the disclosure, embodiments also take the form of a computer program product that includes a non-transitory or non-transient computer-readable storage medium storing computer-executable code for mobile device service. The code, when executed, is configured to perform actions in accordance with a method for providing mobile device service as described herein. As actions of the disclosed methods may be provided in different sequences, so the computer-executable code may be configured to provide a service having a different sequence of actions from those explicitly disclosed. In some examples, the code may be downloaded from a software application store to a data processing unit.

An example computer program product may include user mobile device memory 1570 with user mobile device diagnostics application 1575 stored thereto. In another example, the computer program product may include a customer care agent terminal memory 1470 with a customer care agent diagnostics application 1475*b* stored thereto. In yet another example, the computer program product may include a memory or storage of server 1200 with the user mobile device diagnostics application 1575, the customer care agent diagnostics application 1475*b* or both stored thereto.

Embodiments of the present disclosure are susceptible to being used for various purposes, including, though not limited to, enabling users to diagnose and service mobile devices.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural. Furthermore, embodiments or features thereof may be combined in various configurations.

What is claimed is:

1. A method for user mobile device service, comprising, with a server communicatively coupled to a network:
   providing, to a customer care agent terminal over the network, a first version of a customer care agent diagnostics screen including a mirror of a user diagnostics screen being presented to a display of the user mobile device;
   receiving, from the user mobile device over the network without display data of the user mobile device display, user mobile device diagnostics data generated by the user mobile device in response to control input received from the customer care agent terminal; and
   providing, to the customer care agent terminal over the network, a second version of the customer care agent diagnostics screen including the mirror of the user diagnostics screen populated with information representative of the diagnostics data received from the user mobile device.

2. The method as set forth in claim 1, further comprising transmitting, to the user mobile device, control input from the customer care agent terminal which is configured to cause the user mobile device to ignore local user mobile device input.

3. The method as set forth in claim 1, further comprising transmitting, to the user mobile device, control input from the customer care agent terminal which is configured to control presentation of the user diagnostics screen and one or more additional user diagnostics screens to the display of the user mobile device.

4. The method as set forth in claim 1, further comprising transmitting, to the user mobile device, control input from the customer care agent terminal which is configured to control testing, troubleshooting or both of hardware components of the user mobile device, software components of the user mobile device or both.

5. The method as set forth in claim 1, further comprising storing the user mobile device diagnostics data in a data storage operatively coupled with the server.

6. The method as set forth in claim 1, wherein the first version of the customer care agent diagnostics screen and the second version of the care agent diagnostics screen include instructions to the customer care agent regarding testing the user mobile device, diagnosing the user mobile device or both.

7. The method as set forth in claim 1, further comprising transmitting, to the user mobile device, a user diagnostics application which, when installed to the user mobile device is configured to cause presentation of the user diagnostics screen to the display of the user mobile device.

8. The method a set forth in claim 1, further comprising providing one or more additional customer care agent diagnostics screens to the customer care agent terminal in response to control input received from the customer care agent terminal.

9. A method for mobile device service, comprising:
   in accordance with a user diagnostics application running on a user mobile device:
      presenting a user diagnostics screen to a display of the user mobile device; and
      recording diagnostics data from the user mobile device in response to input made at a customer care agent terminal;
      mirroring the user diagnostics screen of the diagnostics application at the customer care agent terminal without transmitting user mobile device display data from the user mobile device; and
      populating the mirrored user diagnostics screen with the diagnostics data.

10. The method as set forth in claim 9, further comprising downloading and installing the diagnostics application to a user mobile device.

11. The method as set forth in claim 9, further comprising controlling the recording of diagnostics data with input from the customer care agent terminal to the diagnostics application.

12. The method as set forth in claim 9, further comprising, in accordance with the diagnostics application, preventing input from the customer care agent terminal from controlling components of the user mobile device not associated with actions of the user diagnostics application.

13. The method as set forth in claim 9, further comprising, with the customer care agent terminal, controlling presentation of the diagnostics screen and one or more additional user diagnostics screens to the display of the user mobile device.

14. A non-transitory computer-readable medium for providing service to a user mobile device, comprising instructions stored thereon in the form of a diagnostics application, that when executed on a processor, cause the processor to:
   present a user diagnostics screen to a display of the user mobile device;
   record diagnostics data from the user mobile device in response to input made at a customer care agent terminal;
   at the customer care agent terminal, mirror the user diagnostics screen of the user diagnostics application without transmitting user mobile device display data from the user mobile device; and
   at the customer care agent terminal, populate the mirrored user diagnostics screen with the recorded diagnostics data.

15. The non-transitory computer-readable medium as set forth in claim 14, wherein the instructions further cause a processor to control the recording of the diagnostics data with input from the customer care agent terminal.

16. The non-transitory computer-readable medium as set forth in claim 14, wherein the instructions further cause a processor to prevent input from the customer care agent terminal from controlling components of the user mobile device not associated with actions of the diagnostics application.

17. A system for providing service to a mobile device, comprising:
- a mobile device;
- a customer care agent terminal coupled with the mobile device through a communications network; and
- a user diagnostics application installed on the mobile device and configured to present a user diagnostics screen to a display of the user mobile device, record diagnostics data from the mobile device in response to input made through the customer care agent terminal and transmit the diagnostics data; and
- a server configured to mirror the user diagnostics screen of the diagnostics application at the customer care agent terminal and populate the user diagnostics screen mirror with the transmitted diagnostics data without display data of the user mobile device.

18. The system as set forth in claim 17, wherein, the user diagnostics application is further configured for downloading from the server to the mobile device and for installation on the mobile device.

19. The system as set forth in claim 17, wherein the user diagnostics application is configured to control recording of diagnostics data with input from the customer care agent terminal.

20. The system as set forth in claim 17, wherein the user diagnostics application is further configured to prevent input from the customer care agent terminal from controlling components of the mobile device not associated with actions of the user diagnostics application.

21. The method as set forth in claim 9, further comprising preventing transmission of user mobile device display data.

22. The non-transitory computer-readable medium as set forth in claim 14, wherein the instructions further cause a processor to prevent transmission of user mobile device display data.

23. The method as set forth in claim 17, wherein the user diagnostics application is further configured to prevent transmission of user mobile device display data.

* * * * *